United States Patent
Karve et al.

(10) Patent No.: US 12,415,568 B2
(45) Date of Patent: Sep. 16, 2025

(54) DRIVER ATTENTION BASED STEERING EFFORT MODULATION TO PREVENT ACCIDENTAL LANE CHANGES

(71) Applicants: Steering Solutions IP Holding Corporation, Auburn Hills, MI (US); Continental Automotive Systems, Inc., Auburn Hills, MI (US)

(72) Inventors: Omkar Karve, Farmington Hills, MI (US); Scott A. Millsap, Grand Blanc, MI (US)

(73) Assignees: Steering Solutions IP Holding Corporation, Auburn Hills, MI (US); Continental Automotive Systems Inc., Auburn Hills, MI (US)

( * ) Notice: Subject to any disclaimer, the term of this patent is extended or adjusted under 35 U.S.C. 154(b) by 318 days.

(21) Appl. No.: 17/859,522

(22) Filed: Jul. 7, 2022

(65) Prior Publication Data
US 2024/0010277 A1    Jan. 11, 2024

(51) Int. Cl.
| | | |
|---|---|---|
| *B62D 15/02* | (2006.01) | |
| *B62D 5/04* | (2006.01) | |
| *B62D 5/30* | (2006.01) | |
| *B62D 6/00* | (2006.01) | |
| *B60W 40/08* | (2012.01) | |

(52) U.S. Cl.
CPC ......... *B62D 15/025* (2013.01); *B62D 5/0457* (2013.01); *B62D 5/30* (2013.01); *B62D 6/007* (2013.01); *B60W 2040/0818* (2013.01); *B62D 6/008* (2013.01); *B62D 15/0215* (2013.01)

(58) Field of Classification Search
CPC .......... B60W 2040/0818; B62D 6/007; B62D 6/008; B62D 15/025
See application file for complete search history.

(56) References Cited

U.S. PATENT DOCUMENTS

| | | | |
|---|---|---|---|
| 8,428,821 B2 * | 4/2013 | Nilsson ................ | B62D 15/025 701/41 |
| 9,744,991 B2 * | 8/2017 | Kirschbaum ............ | B62D 5/09 |
| 10,046,743 B2 | 8/2018 | Jonasson et al. | |
| 10,046,749 B2 | 8/2018 | Jonasson et al. | |
| 11,173,901 B2 * | 11/2021 | Okano ................. | B60W 10/20 |
| 2023/0227100 A1 * | 7/2023 | Suzuki ................ | B62D 5/0463 180/446 |

FOREIGN PATENT DOCUMENTS

| | | | |
|---|---|---|---|
| DE | 102008044075 A1 | 5/2010 | |
| DE | 102020123685 A1 | 3/2022 | |
| GB | 2583898 A * | 11/2020 | ............ B60W 10/20 |

OTHER PUBLICATIONS

DE Office action dated Feb. 20, 2024 for DE application No. 10 2022 121 581.4.
German Office Action dated Mar. 22, 2023 Application No. 10 2022 121 581.4; Applicant: Continental Automotive Systems, Inc. et al; 9 pages.

* cited by examiner

*Primary Examiner* — Mark L. Greene
(74) *Attorney, Agent, or Firm* — Ingrassia Fisher & Lorenz, LLP

(57) ABSTRACT

A number of variations may include a vehicle, system and method of modulating power steering or torque from a lane keep assist system based on driver attentiveness to avoid accidental land changes.

13 Claims, 3 Drawing Sheets

DRIVER ATTENTION BASED STEERING EFFORT MODULATION TO PREVENT ACCIDENTAL LANE CHANGES

TECHNICAL FIELD

The field to which the disclosure generally relates to vehicle with electric or hydraulic power steering, or lane keep assist, and systems and methods using the same.

BACKGROUND

Vehicles typically include power steering systems.

SUMMARY OF ILLUSTRATIVE VARIATIONS

A number of variations may include a vehicle, system and method of modulating power steering or torque from a lane keep system based on driver attentiveness to avoid accidental land changes.

Other illustrative variations within the scope of the invention will become apparent from the detailed description provided hereinafter. It should be understood that the detailed description and specific examples, while disclosing variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

Figure 1:
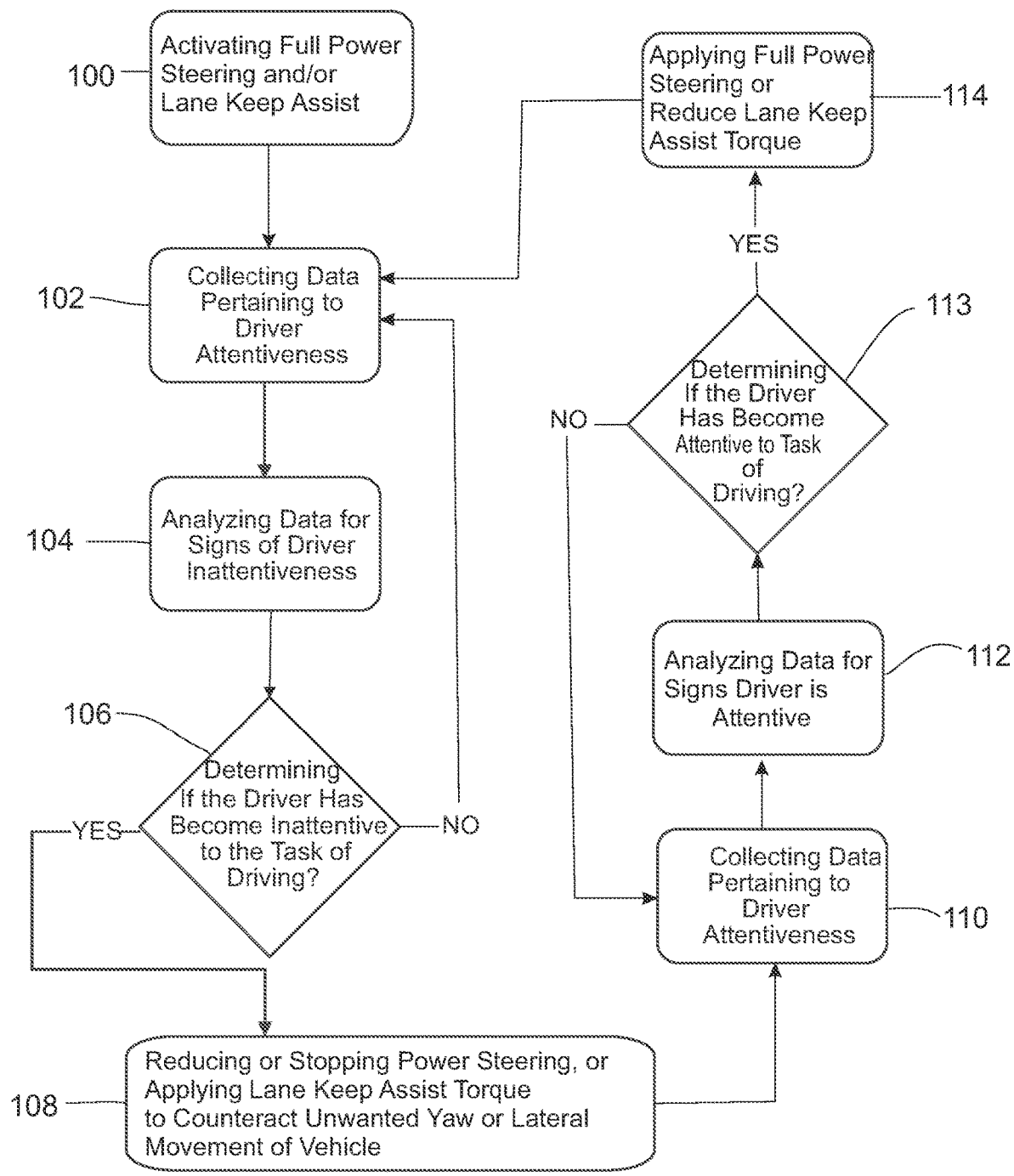
FIG. 1 is a flow diagram illustrating a method of modulating power steering assist based on driver attentiveness according to a number of variations.

The following description of the variations is merely illustrative in nature and is in no way intended to limit the scope of the invention, its application, or uses.

In level 2-3 ADAS systems or even in case of full manual driving, driver monitoring input can be used to reduce assist in steering system when the driver attention is not on the road ahead. This will reduce chances of driver inadvertently leaving the current lane due to hands being on the wheel causing vehicle yaw movement due to full availability of power assist. If the assist in this situation is reduced, amount of torque required to cause yaw movement will be substantially more.

When a driver (in manual mode driving) is distracted and looses focus on the road, the ability to keep steering wheel on center (when the road is straight) is also lost. The weight of the hand/s can cause the steering system assist to kick in and cause yaw movement of the vehicle leading it to veer into another lane. A vehicle as describer hereafter may include a lane keep assist (LKA) system including an algorithm that uses the inputs of measured steering wheel torque and position of the vehicle relative to lane boundaries to determine if lane keeping steering torque should be produced. If the inattentive driver is applying sufficient steering wheel torque input then there could be instances where the lane keeping assist torque is not sufficient to avoid the vehicle crossing over the lane boundary. LKA systems most often use a forward-looking camera to identify lane boundary markings/painted lines. Very often road and/or environmental conditions (e.g., snow, heavy rain) make it difficult to identify the lane boundaries so the lane keeping system has a temporary loss of confidence in the lane boundary and is unable to generate the lane keeping steering torque request if needed.

By accepting an input from driver monitoring system, which can tell us levels of attention that the driver has or just provide a flag confirming that the driver is being assessed as "inattentive", the steering system will reduce assist levels. With reduced assist levels, torque caused by the weight of a hand or higher torque due to tensed uncontrolled muscles will not generate enough assist from the power assist mechanism to generate sufficient yaw movement in the vehicle. A second implementation could be an enhancement to existing lane keeping assistance equipped vehicles. The input from the driver monitoring system would be used to supplement the lane position of the vehicle to provide an "early lane keeping steering torque of smaller magnitude" to counteract the inattentive driver from inducing the unwanted yaw or lateral response.

The vehicle may be installed with a form of driver monitoring system which can distinguish between an attentive driver and an inattentive driver. This may be in the form of cameras looking at the driver's face/body or hands based attention systems. The output of this system can be either a simple flag confirming whether the driver is attentive or not attentive along with the time stamp at which the event occurred. In addition the system may also output a varying scale of attentiveness. This information will be sent out over available communication system to which the steering system is connected. The steering system ECU may monitor this signal and when appropriate (when the driver is deemed inattentive) will switch the power assist available for the given amount of torque being input from the steering column to be lower than normal or turn it off completely. This may be done in a controlled manner so as to prevent kick in the system and will also be able to bring the assist back gradually (which will be tunable) when the driver regains attention. In a similar method, a steering system that is supporting lane keeping assistance could modify the lane keeping steering torque overlay based upon the received driver attentiveness input.

This can be standard feature in all vehicles that have some form of driver monitoring and also have an electric power assisted steering system or hydraulic PAS with some ECU based control for the assist boost.

A number of variations may include the integration of driver monitoring and steering system effort assist with reduction of assist based on driver attention, and resumption of assist based on driver regaining attention.

Referring now to FIG. 1, a number of variations may include a method and/or system for carrying out the method including increasing the force a driver of a vehicle must exert on a steering wheel or steering interface in response to a determination that the driver is inattentive to the task of driving so that unwanted yaw or vehicle movement is avoided or reduced. The method may include activating full power steering assist and/or lane keep assist 100. For example, the activation of full power steering assist and/or lane keep assist may occur upon starting the vehicle or by pressing button or other means activating the same. Next, collecting data pertaining to driver attentiveness 102, and analyze the data for signs of driver inattentiveness 104. Then determining if the driver has not become inattentive to the task of driving 106, and if so repeating steps 102, 104, and 106. If not, then reducing or stopping power steering, or applying lane keep assist torque to counteract unwanted yaw or lateral movement of the vehicle 108. Thereafter, collecting data pertaining to driver attentiveness 110. Thereafter, analyzing data for signs of driver attentiveness 112. Determining if the driver has become attentive to the task of driving 113. If the driver is not attentive, then repeating steps 110 and 112. If the driver is attentive, then applying full power steering or reducing lane keep assist torque 114. Full power steering may be restored in an incremental fashion. Thereafter, the method repeats from step 102.

Figure 2:
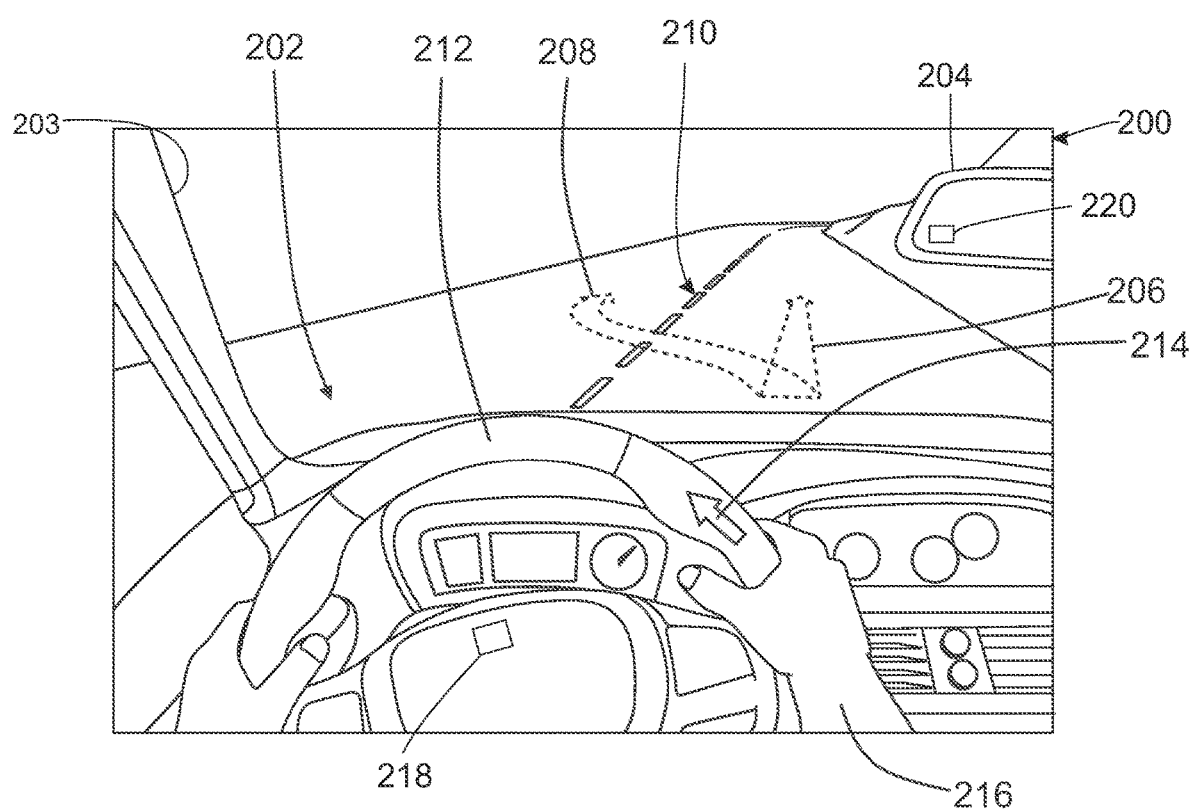
FIG. 2 is a schematic illustration of a vehicle drive attentiveness monitoring system.

FIG. 2 illustrates the view of a driver through a front windshield 203 of a vehicle traveling on a driving surface 202 which may include one or more lane markers 210. The vehicle is on a path indicated by arrow 206 so that the vehicle stays within lane markers 210. Even though one or more hands 216 of the driver may be on the vehicle steering wheel 212 the driver may become inattentive, for example, by looking off to the side of the road or reaches in the cabin for an object and causes the steering wheel 210 to move or rotate in the direction indicated by arrow 214. The movement or rotation of the wheel 210 may cause the vehicle to stray to the path indicated by arrow 208 and cross over the lane maker 210. To prevent unwanted yaw or lateral movement the vehicle may have a camera 218 which may be positioned anywhere in the vehicle such as the passenger cabin. In one variation, the camera may be placed on the steering wheel 212. In another variation an alternative or additional camera 220 may be positioned on a rear-view mirror 204 of the vehicle. The camera 218, 220 may be utilize to collect data pertaining to the driver attentiveness. A controller as described hereafter may be used to carry out the methods described herein to prevent unwanted yaw or lateral movement the vehicle.

Figure 3:
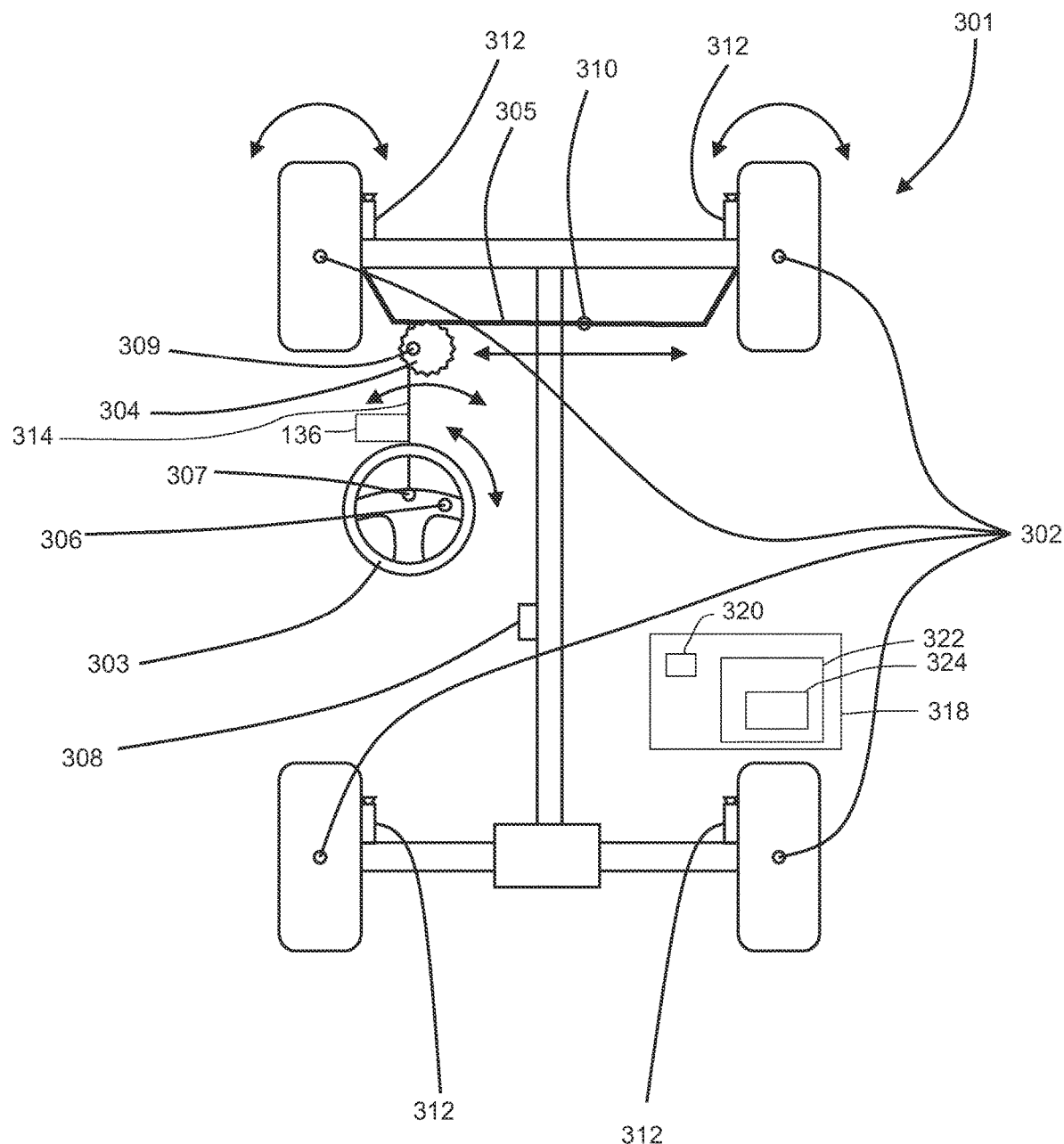
FIG. 3 is a schematic illustration of a vehicle and system for modulating power steering assist based on driver attentiveness according to a number of variations.

Referring now to FIG. 3, an illustrative variation of a vehicle equipped with hardware that allows it to carry out at least some of the methods disclosed herein is shown. A vehicle 301 is equipped with wheels 302 and a handwheel 303 for turning the wheels 302 via a pinion 304 that engages a rack 305 that is constructed and arranged to turn the wheels 302. In the illustrative variation shown, the handwheel 303 is equipped with a hand wheel torque sensor 306 and a hand wheel angle sensor 307 so that any turning of the handwheel may produce sensor data that may be communicated to or accessed by a controller 308. Although, in this illustrative variation, the controller 308 is shown onboard the vehicle, the controller may also be located somewhere apart from the vehicle and communicated with wirelessly by the sensors or the vehicle. The pinion 304 may be equipped with a pinion torque sensor 309 so that any turning of the pinion may be observed by or communicated to the controller 308 and utilized by the methods described herein. In the illustrative variation shown, the rack 305 is equipped with a rack force sensor 310 so that any rack forces detected during driving may be observed by or communicated to the controller 308 and utilized by the methods described herein. The vehicle may have a steering shaft 314 connecting the steering wheel or steering interface 303 to the pinion 304. An electric power steering assist or hydraulic power steering device 316 may be connected to the shaft 314 to assist the drive in steering the wheels of the vehicle by reduce the force or torque the driver would need to apply to the steering wheel or steering interface 303 if the power steering device 316 was not present. Also shown in this illustrative variation, the wheels 302 may be equipped with road wheel sensors so that any road wheel data detected during driving may be observed by or communicated to the controller 308 and utilized by the methods described herein. Additionally, in the illustrative variation shown, cameras 312 are located near the wheels 302, though at least one of the cameras 312 may be located elsewhere in other illustrative variations. The cameras 312 may be used in conjunction with any sensor on the vehicle 301 that aids in monitoring vehicle travel or usage data at least for the purposes of the methods described herein. Another controller 318 may be provided and may include a processor 320, memory 322, wherein the instructions stored in the memory 322 are executable by the processor to modulate the power steering from providing full power steering to less than full power steering or to completely stop the power steering device from assisting the driver to steer the vehicle; or to apply lane keep assist torque to the steering wheel or steering interface 303 to counteract unwanted yaw or lateral movement of the vehicle that could otherwise by created by an inattentive driver. A separate controller similarly configured as controller 318 may be used to control the lane keep assist function and to apply lane keep assist torque to the steering wheel or steering interface 303 counteract unwanted yaw or lateral movement of the vehicle that could otherwise occur by an inattentive driver.

The above description of select variations within the scope of the invention is merely illustrative in nature and, thus, variations or variants thereof are not to be regarded as a departure from the spirit and scope of the invention.

What is claimed is:

1. A method comprising determining if an unconscious torque application by an inattentive driver of a vehicle is turning the vehicle in the direction opposite of a road curvature ahead of the vehicle, and in response to a determination that an unconscious torque application by the inattentive driver is turning the vehicle in the direction opposite of the road curvature ahead of the vehicle completely stopping an electric or hydraulic power steering of the vehicle to counteract unwanted yaw or vehicle movement.

2. A method comprising:
   (a) activating full power steering and/or lane keep assist in a vehicle;
   (b) collecting data pertaining to driver attentiveness;
   (c) analyzing the data for signs of driver inattentiveness;
   (d) determining if the driver has not become inattentive to the task of driving, and if so repeating acts (a), (b), and (c), and if not, then completely stopping power steering to counteract unwanted yaw or lateral movement of the vehicle if an unconscious torque application by the inattentive driver of the vehicle is turning the vehicle in the direction opposite of a road curvature ahead of the vehicle;
   (e) thereafter, collecting data pertaining to driver attentiveness;
   (f) analyzing data for signs of driver attentiveness;
   (g) determining if the driver has become attentive to the task of driving, and if not, repeating acts (e), (f) and (g), and if the driver is attentive, then applying full power steering;
   (h) thereafter, repeating acts (a)-(g).

3. The method as set forth in claim 2 wherein in step (g) applying full power steering is accomplished in an incremental fashion.

4. The method as set forth in claim 2 wherein the power steering is electric power steering assist.

5. The method as set forth in claim 2 wherein the power steering is hydraulic power steering.

6. The method as set forth in claim 2 wherein act (g) comprises applying lane keep assist torque to counteract unwanted yaw or lateral movement of the vehicle.

7. A system for using in a vehicle comprising a power steering system or a lane keep assist system, a controller comprising at least one processor, memory and instructions stored in the memory executable by the processor causing the system to carry out the acts comprising:
   (a) activating full power steering and/or lane keep assist in a vehicle;
   (b) collecting data pertaining to driver attentiveness;
   (c) analyzing the data for signs of driver inattentiveness;
   (d) determining if the driver has not become inattentive to the task of driving, and if so repeating acts (a), (b), and (c), and if not, then completely stopping power steering to counteract unwanted yaw or lateral movement of the vehicle if an unconscious torque application by the inattentive driver of the vehicle is turning the vehicle in the direction opposite of a road curvature ahead of the vehicle;
   (e) thereafter, collecting data pertaining to driver attentiveness;
   (f) analyzing data for signs of driver attentiveness;
   (g) determining if the driver has become attentive to the task of driving, and if not, repeating acts (e), (f) and (g), and if the driver is attentive, then applying full power steering;
   (h) thereafter, repeating acts (a)-(g).

8. The system as set forth in claim 7 wherein in act (g) applying full power steering is accomplished in an incremental fashion.

9. The system as set forth in claim 7 wherein act (g) comprises reducing or stopping power steering to counteract unwanted yaw or lateral movement of the vehicle.

10. The system as set forth in claim 9 wherein the power steering is electric power steering assist.

11. The system as set forth in claim 9 wherein the power steering is hydraulic power steering.

12. The system as set forth in claim 7 comprising applying lane keep assist torque to counteract unwanted yaw or lateral movement of the vehicle.

13. A system for using in a vehicle comprising a power steering system or a lane keep assist system, a controller comprising at least one processor, memory and instructions stored in the memory executable by the processor causing the system to carry out the acts comprising:
   determining if a driver of the vehicle is inattentive and if so, monitoring the road conditions ahead of the vehicle;
   determining if an unconscious torque application by the inattentive driver is turning the vehicle in the direction of a road curvature ahead of the vehicle, and if so, then not reducing or modulating the steering assist levels;
   and determining if an unconscious torque application by the inattentive driver is turning the vehicle in the direction opposite of the road curvature ahead of the vehicle, and if so, then completely stopping steering assist.

* * * * *